United States Patent
Brannan et al.

(10) Patent No.: US 12,433,676 B2
(45) Date of Patent: Oct. 7, 2025

(54) ABLATION SYSTEM WITH DISPLAY FOR REAL-TIME ABLATION GROWTH PROJECTION, AND METHOD THEREFOR

(71) Applicant: Covidien LP, Mansfield, MA (US)

(72) Inventors: Joseph D. Brannan, Lyons, CO (US); Casey M. Ladtkow, Erie, CO (US)

(73) Assignee: Covidien LP, Mansfield, MA (US)

( * ) Notice: Subject to any disclaimer, the term of this patent is extended or adjusted under 35 U.S.C. 154(b) by 673 days.

(21) Appl. No.: 17/415,903

(22) PCT Filed: Dec. 11, 2019

(86) PCT No.: PCT/US2019/065592
§ 371 (c)(1),
(2) Date: Jun. 18, 2021

(87) PCT Pub. No.: WO2020/131506
PCT Pub. Date: Jun. 25, 2020

(65) Prior Publication Data
US 2022/0071706 A1    Mar. 10, 2022

Related U.S. Application Data (60) Provisional application No. 62/783,307, filed on Dec. 21, 2018.

(51) Int. Cl.
*A61B 5/06* (2006.01)
*A61B 18/00* (2006.01)
(Continued)

(52) U.S. Cl.
CPC .......... *A61B 34/10* (2016.02); *A61B 18/1815* (2013.01); *A61B 34/20* (2016.02);
(Continued)

(58) Field of Classification Search
CPC ..... A61B 34/10; A61B 18/1815; A61B 34/20; A61B 5/00; A61B 5/0002; A61B 5/0033;
(Continued)

(56) References Cited

U.S. PATENT DOCUMENTS 6,575,969 B1 * 6/2003 Rittman, III ....... A61B 18/1482
606/41
2009/0318804 A1 * 12/2009 Avital .................... A61B 90/11
600/445

FOREIGN PATENT DOCUMENTS

EP    2392255 B1 *  8/2013  ......... A61B 18/1477
EP    2666432 A1 * 11/2013  ......... A61B 18/1477
(Continued)

OTHER PUBLICATIONS

International Search Report and Written Opinion of the International Searching Authority issued in corresponding application PCT/US2019/065592 mailed Apr. 17, 2020 (15 pages).

*Primary Examiner* — Ronald Hupczey, Jr.
*Assistant Examiner* — Ana Veruska Guerrero
(74) *Attorney, Agent, or Firm* — Carter, DeLuca & Farrell LLP (57) ABSTRACT

A method for displaying real-time ablation growth projections is provided. The method includes applying, by a processor, an ablation model to image data of a patient. The ablation model is based on a position of an ablation probe, and the ablation probe is coupled to the processor. The method also includes displaying, on a display coupled to the processor, a projected ablation zone on the image data. The projected ablation zone is based on ablation parameters and the position of the ablation probe. The projected ablation zone includes a margin showing a confidence level. The method further includes ablating by the ablation probe. The ablating is based on an evaluation of the projected ablation zone with respect to a target. A system for performing a
(Continued)

microwave ablation procedure is provided. A non-transitory computer-readable storage medium storing instructions is provided.

14 Claims, 5 Drawing Sheets

(51) Int. Cl.
| | |
|---|---|
| *A61B 18/18* | (2006.01) |
| *A61B 34/10* | (2016.01) |
| *A61B 34/20* | (2016.01) |
| *G16H 30/40* | (2018.01) |
| *G16H 50/50* | (2018.01) |
| *A61B 5/00* | (2006.01) |
| *A61B 5/0507* | (2021.01) |
| *A61B 5/08* | (2006.01) |
| *A61B 34/30* | (2016.01) |
| *G16H 40/60* | (2018.01) |

(52) U.S. Cl.
CPC ............ *G16H 30/40* (2018.01); *G16H 50/50* (2018.01); *A61B 5/00* (2013.01); *A61B 5/0002* (2013.01); *A61B 5/0033* (2013.01); *A61B 5/004* (2013.01); *A61B 5/0048* (2013.01); *A61B 5/0071* (2013.01); *A61B 5/0507* (2013.01); *A61B 5/061* (2013.01); *A61B 5/065* (2013.01); *A61B 5/066* (2013.01); *A61B 5/08* (2013.01); *A61B 5/68* (2013.01); *A61B 5/6801* (2013.01); *A61B 2018/00541* (2013.01); *A61B 2018/00577* (2013.01); *A61B 2018/00702* (2013.01); *A61B 2018/00761* (2013.01); *A61B 2018/00964* (2013.01); *A61B 2018/00988* (2013.01); *A61B 2018/183* (2013.01); *A61B 2034/101* (2016.02); *A61B 2034/104* (2016.02); *A61B 2034/107* (2016.02); *A61B 2034/2046* (2016.02); *A61B 2034/2051* (2016.02); *A61B 2034/2055* (2016.02); *A61B 2034/2065* (2016.02); *A61B 2034/301* (2016.02); *G16H 40/60* (2018.01)

(58) Field of Classification Search
CPC ..... A61B 5/004; A61B 5/0048; A61B 5/0071; A61B 5/0507; A61B 5/061; A61B 5/065; A61B 5/066; A61B 5/08; A61B 5/68; A61B 5/6801; A61B 2018/00541; A61B 2034/105; A61B 2018/00577; A61B 2018/00702; A61B 2018/00761; A61B 2018/00964; A61B 2018/00988; A61B 2018/183; A61B 2034/101; A61B 2034/104; A61B 2034/107; A61B 2034/2046; A61B 2034/2051; A61B 2034/2055; A61B 2034/2065; A61B 2034/301; A61B 5/02007; A61B 5/026; A61B 5/055; A61B 5/062; A61B 2018/00642; G16H 30/40; G16H 50/50; G16H 40/60; G16H 40/63
See application file for complete search history.

(56) References Cited

FOREIGN PATENT DOCUMENTS

| | | |
|---|---|---|
| EP | 3366252 A1 | 8/2018 |
| WO | 2010138303 A1 | 12/2010 |

* cited by examiner

ABLATION SYSTEM WITH DISPLAY FOR REAL-TIME ABLATION GROWTH PROJECTION, AND METHOD THEREFOR

CROSS-REFERENCE TO RELATED APPLICATIONS

This application is a U.S. National Stage Application filed under 35 U.S.C. § 371 (a) of International Patent Application No. PCT/US2019/065592, filed Dec. 11, 2019, which claims the benefit of the filing date of provisional U.S. Patent Application No. 62/783,307, filed Dec. 21, 2018.

BACKGROUND

Technical Field

The present disclosure relates to a system and method for displaying real-time ablation growth projections.

Discussion of Related Art

Treatment of certain diseases requires the destruction of malignant tissue growths, e.g., tumors. Electromagnetic radiation can be used to heat and destroy tumor cells. Treatment may involve inserting ablation probes into tissues where cancerous tumors have been identified. Once the probes are positioned, electromagnetic energy is passed through the probes into surrounding tissue.

In the treatment of diseases such as cancer, certain types of tumor cells have been found to denature at elevated temperatures that are slightly lower than temperatures normally injurious to healthy cells. Known treatment methods, such as hyperthermia therapy, heat diseased cells to temperatures above 41° C. while maintaining adjacent healthy cells below the temperature at which irreversible cell destruction occurs. These methods involve applying electromagnetic radiation to heat or ablate tissue.

Electrosurgical devices utilizing electromagnetic radiation have been developed for a variety of uses and applications. Typically, apparatus for use in ablation procedures include a power generation source, e.g., a microwave or radio frequency (RF) electrosurgical generator that functions as an energy source, and a surgical instrument (e.g., microwave ablation probe having an antenna assembly) for directing energy to the target tissue. The generator and surgical instrument are typically operatively coupled by a cable assembly having a plurality of conductors for transmitting energy from the generator to the instrument, and for communicating control, feedback and identification signals between the instrument and the generator.

There are several types of microwave probes in use, e.g., monopole, dipole and helical, which may be used in tissue ablation applications. In monopole and dipole antenna assemblies, microwave energy generally radiates perpendicularly away from the axis of the conductor. Monopole antenna assemblies typically include a single, elongated conductor. A typical dipole antenna assembly includes two elongated conductors that are linearly-aligned and positioned end-to-end relative to one another with an electrical insulator placed therebetween. Helical antenna assemblies include helically-shaped conductor configurations of various dimensions, e.g., diameter and length. The main modes of operation of a helical antenna assembly are normal mode (broadside), in which the field radiated by the helix is maximum in a perpendicular plane to the helix axis, and axial mode (end fire), in which maximum radiation is along the helix axis.

The particular type of tissue ablation procedure may dictate a particular ablation volume in order to achieve a desired surgical outcome. Ablation volume is correlated with antenna design, antenna performance, antenna impedance, ablation time and wattage, and tissue characteristics, e.g., tissue electrical properties, tissue thermal mass, and tissue fluid movement.

Because of the small temperature difference between the temperature required for denaturing malignant cells and the temperature normally injurious to healthy cells, a known heating pattern and precise temperature control is needed to lead to more predictable temperature distribution. In this manner, the ablation procedure can be performed to eradicate the tumor cells while minimizing the damage to otherwise healthy tissue surrounding the tissue to which electrosurgical energy is being applied.

SUMMARY

In an aspect of the present disclosure, a method for displaying real-time ablation growth projections is provided. The method includes applying, by a processor, an ablation model to image data of a patient. The ablation model is based on a position of an ablation probe, and the ablation probe is coupled to the processor. The method also includes displaying, on a display coupled to the processor, a projected ablation zone on the image data. The projected ablation zone is based on ablation parameters and the position of the ablation probe. The projected ablation zone includes a margin showing a confidence level. The method further includes ablating by the ablation probe. The ablating is based on an evaluation of the projected ablation zone with respect to a target.

In another aspect of the present disclosure, the method also includes adjusting the ablation parameters to be further ablation parameters, and displaying a further projected ablation zone on the image data, the further projected ablation zone being based on the further ablation parameters, the further projected ablation zone including a further margin showing a further confidence level.

In yet another aspect of the present disclosure, the ablating, by the ablation probe, is further based on a further evaluation of the further projected ablation zone with respect to the target. The ablating is performed using the further ablation parameters.

In an aspect of the present disclosure, the method also includes determining the ablation parameters based on at least one of a target position, a target size, a target shape, and the position of the ablation probe. The method further includes displaying the ablation parameters.

In another aspect of the present disclosure, the method includes determining that the projected ablation zone is sub-optimal based on comparing the projected ablation zone, the margin, and the target. The method also includes adjusting the ablation parameters to be further ablation parameters, and displaying the further ablation parameters.

In yet another aspect of the present disclosure, the ablation parameters include a time selection and a power selection.

In an aspect of the present disclosure, the projected ablation zone includes at least one other margin showing at least one other confidence level.

In another aspect of the present disclosure, the method includes displaying the margin and the at least one other margin using at least one of different colors and different shading.

In yet another aspect of the present disclosure, the method further includes displaying a numerical value for the confidence level.

In an aspect of the present disclosure, the image data includes information including at least one of a tissue material, a disease condition, and an arterial position. The applying of the ablation model to the image data of a patient includes deflecting the projected ablation zone based on the information.

In another aspect of the present disclosure, the position of the ablation probe is a projected position of the ablation probe determined prior to an ablation procedure.

In yet another aspect of the present disclosure, the method includes tracking the ablation probe during an ablation procedure. The position of the ablation probe is a current position of the ablation probe during the ablation procedure.

In an aspect of the present disclosure, the evaluation of the projected ablation zone with respect to the target includes determining that the current position of the ablation probe is sub-optimal. The method further includes outputting instructions to re-position the ablation probe and/or position a second ablation probe.

In another aspect of the present disclosure, the method also includes receiving at the processor information identifying the target.

In yet another aspect of the present disclosure, the method also includes identifying the target by the processor.

In an aspect of the present disclosure, a system for performing a microwave ablation procedure is provided. The system includes an ablation probe and an electromagnetic tracking system configured to track a location of the ablation probe, while the ablation probe is navigated inside a patient, by using at least one electromagnetic sensor located on the ablation probe. The system also includes a computing device including a processor and a memory storing instructions. The instructions, when executed by the processor, cause the computing device to apply, by a processor, an ablation model to image data of the patient. The ablation model is based on a position of the ablation probe, and the ablation probe is coupled to the processor. The instructions further cause the computing device to display, on a display coupled to the processor, a projected ablation zone on the image data. The projected ablation zone is based on ablation parameters and the position of the ablation probe. The projected ablation zone includes a margin showing a confidence level. The instructions also cause the computing device to ablate by the ablation probe. The ablating is based on an evaluation of the projected ablation zone with respect to a target.

In another aspect of the present disclosure, a non-transitory computer-readable storage medium storing instructions is provided. The instructions, when executed by a processor, cause a computing device to apply, by the processor, an ablation model to image data of a patient. The ablation model is based on a position of an ablation probe. The ablation probe is coupled to the processor. The instructions, when executed by the processor, cause the computing device to display, on a display coupled to the processor, a projected ablation zone on the image data. The projected ablation zone is based on ablation parameters and the position of the ablation probe. The projected ablation zone includes a margin showing a confidence level. The instructions, when executed by the processor, cause the computing device to ablate by the ablation probe. The ablating is based on an evaluation of the projected ablation zone with respect to a target.

Any of the above aspects and embodiments of the present disclosure may be combined without departing from the scope of the present disclosure.

BRIEF DESCRIPTION OF THE DRAWINGS

Objects and features of the presently disclosed system and method will become apparent to those of ordinary skill in the art when descriptions of various embodiments thereof are read with reference to the accompanying drawings, of which.

DETAILED DESCRIPTION

Although the present disclosure will be described in terms of specific illustrative embodiments, it will be readily apparent to those skilled in this art that various modifications, rearrangements and substitutions may be made without departing from the spirit of the present disclosure. The scope of the present disclosure is defined by the claims appended hereto.

The present disclosure proposes a system and method for determining, displaying, and adjusting a projected ablation zone. Ablation zones can be predicted from retrospective data sources as well as real-time data sources, such as imaging of anatomy (vessels, blood flow rate, organ boundaries, organ disease state, tumor boundaries, etc.). The ablation prediction will have a confidence interval, such as 80% confidence that the ablation will be between 3.5 and 4.0 cm in diameter. Alternatively, the entire boundary of the predicted zone may have a varying confidence range. The present disclosure proposes a method of displaying this predicted ablation zone with an associated confidence interval, which may be utilized from prior to activation of the ablation energy (calculation of predicted zone) to completion of ablation energy application.

A boundary of the predicted ablation zone may not be a single contour, but rather a zone of certainty (an 80% confidence interval, for example). This predicted zone may be calculated from a planned ablation power and time, and ablation results from previous clinical applications and/or ablation models. Other sources of data may be utilized to obtain the prediction (for example, organ type, anatomy, disease state, etc.). The confidence interval prediction includes a zone of certainty for all time points between the time of energy activation until the time of energy deactivation. When the energy is activated, this predicted zone of certainty may be displayed in sync with the ablation actually performed. A result is visualization of the confidence interval of the growing ablation zone in real-time.

In this manner, real-time visualization of the ablation zone may be achieved. By providing this visualization, real-time decisions regarding completeness of ablation (or sparing of healthy tissues) may be supported.

Figure 1:
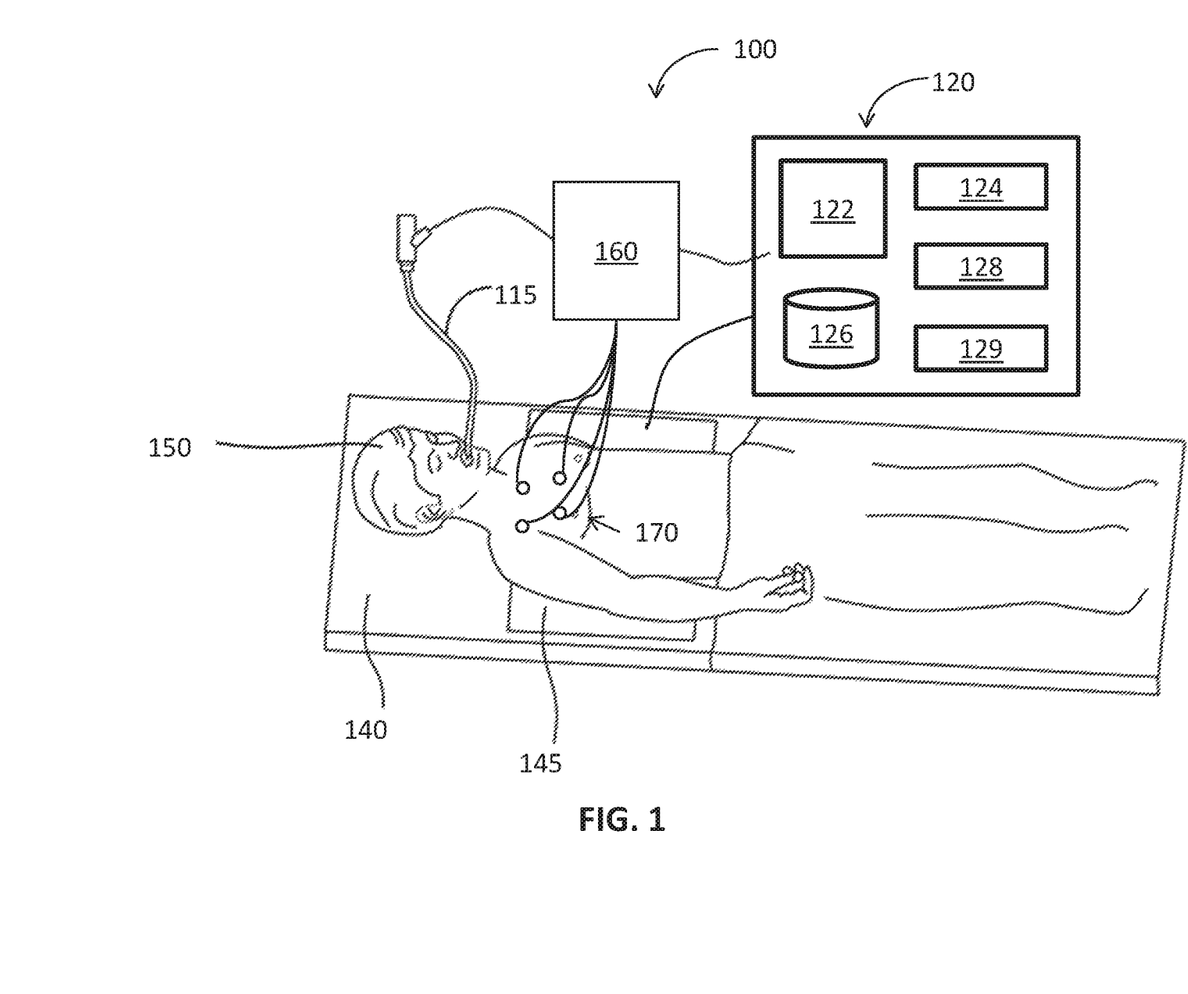
FIG. 1 is a schematic view of an exemplary system in accordance with an embodiment of the present disclosure.

FIG. 1 illustrates an example ablation system 100 provided in accordance with the present disclosure. In general, ablation system 100 is configured to identify a location and/or an orientation of an ablation probe being navigated toward a target location within the patient's body by using, among other things, an antenna assembly that generates one or more electromagnetic fields that are sensed by a sensor affixed to the medical device. In some cases, ablation system 100 is further configured to utilize computed tomography (CT) images, magnetic resonance imaging (MRI) images, and/or fluoroscopic images during navigation of the medical device through the patient's body toward a target of interest.

Ablation system 100 includes an ablation probe 115, a computing device 120, a patient platform 140 (which may be referred to as an EM board), a tracking device 160, and reference sensors 170. Ablation probe 115 is operatively coupled to the computing device 120 (by way of the tracking device 160) via wired connections (as shown in FIG. 1) or wireless connections.

During a navigation phase of a procedure, ablation probe 115 is inserted into the oral cavity of a patient 150 and an electromagnetic (EM) sensor affixed to ablation probe 115 is configured to receive a signal based on an electromagnetic field radiated by the antenna assembly 145, and based upon the received signal, is used to determine a location and/or an orientation of the ablation probe 115 during navigation through the luminal network of the lung.

Computing device 120, such as a laptop, desktop, tablet, or other suitable computing device, includes display 122, one or more processors 124, one or more memories 126, a network interface controller 128, and one or more input devices 129. The particular configuration of the computing device 120 illustrated in FIG. 1 is provided as an example, but other configurations of the components shown in FIG. 1 as being included in the computing device 120 are also contemplated. In particular, in some embodiments, one or more of the components (122, 124, 126, 128, and/or 129) shown in FIG. 1 as being included in the computing device 120 may instead be separate from computing device 120 and may be coupled to the computing device 120 and/or to any other component(s) of ablation system 100 by way of one or more respective wired or wireless path(s) to facilitate the transmission of power and/or data signals throughout ablation system 100.

In some aspects, ablation system 100 may also include multiple computing devices 120, wherein the multiple computing devices 120 are employed for planning, treatment, visualization, or helping clinicians in a manner suitable for medical operations. The display 122 may be touch-sensitive and/or voice-activated, enabling the display 122 to serve as both an input device and an output device. Display 122 may display two-dimensional (2D) images or three-dimensional (3D) images, such as a 3D model of a lung, to enable a practitioner to locate and identify a portion of the lung that displays symptoms of lung diseases. The display of the projected ablation zone may be a two-dimensional view, but a user may sweep the imaging plane across the 3D targeted region to visualize image artifacts and/or notations in 3D. The system may support this use by constructing a 3D volume model as the user sweeps the probe through the targeted region for display. The model may include target images and/or information, ablation zone(s) with confidence interval, real-time ablation zone growth, and/or anything previously segmented (e.g., vessels and organs). The content shown on display 122 is discussed in more detail in the following.

The one or more memories 126 store one or more programs and/or computer-executable instructions that, when executed by the one or more processors 124, cause the one or more processors 124 to perform various functions and/or procedures. For example, the processors 124 may calculate a location and/or an orientation of ablation probe 115 based on the electromagnetic signal that is radiated by the antenna assembly 145 and received by an EM sensor on ablation probe 115. The processors 124 may also perform image-processing functions to cause the 3D model of the lung to be displayed on the display 122. The processors 124 may also generate one or more electromagnetic signals to be radiated by way of the antenna assembly 145. In some embodiments, computing device 120 may further include a separate graphic accelerator that performs only the image-processing functions so that the one or more processors 124 may be available for other programs. The one or more memories 126 also store data, such as mapping data for electromagnetic navigation (EMN), image data, patients' medical record data, prescription data, and/or data regarding a history of the patient's diseases, and/or other types of data.

FIGS. 2A-2E are schematic illustrations displaying real-time ablation growth projections, and depict visualization artifacts overlaid on procedural imaging. For example, a computed tomography (CT) or magnetic resonance (MR) image may be registered with an ultrasound (US) image, for example a CT/ultrasound fusion.

Figure 2A:
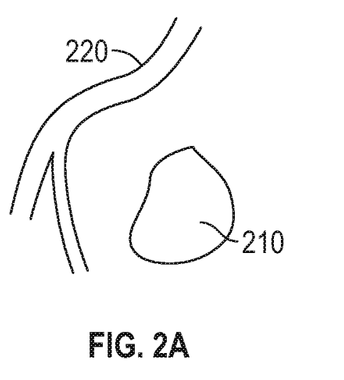
FIGS. 2A-2F are schematic illustrations displaying real-time ablation growth projections in accordance with embodiments of the present disclosure.

FIG. 2A illustrates vessel 220 in a position proximal to tumor 210, as may be the situation in a patient. In alternative embodiments, vessel 220 may be an organ or other tissue, and tumor 210 may be any area of interest which is to be ablated. Tumor boundaries and vessels may be segmented by the software out of the CT or MR image. Tumor boundaries may be highlighted with contrast enhanced ultrasound (CEUS) for this step. Alternatively or additionally, vessels and tumor(s) may be denoted by a user directly on the display, using a finger on a touch screen, or a mouse or other appropriate user input. Three planes may be denoted by the user for a tumor. Vessels may be denoted by following the vessel location as an ultrasound is scanned through the anatomy. A flow rate through vessels may be assumed based upon vessel size, and/or measured by an ultrasound Doppler method. The flow rate may be tagged to the vessel cross section where measured, and displayed directly on the vessel in the fused image or separately. A user may input other information from a user interface (UI) menu, such as cirrhotic liver tissue, metastatic tumor, primary tumor, ischemic tumor, and/or highly vascularized tumor.

Figure 2B:
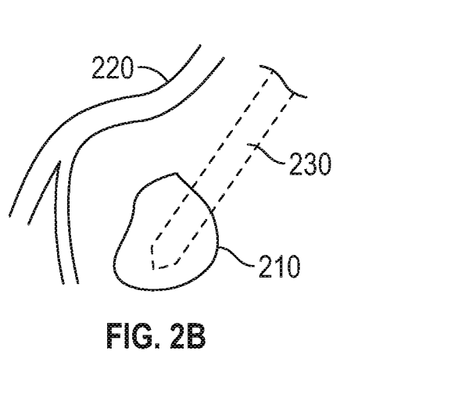

FIG. 2B illustrates antenna 230 which has been inserted into a patient and positioned with the distal end in tumor 210, and with vessel 220 situated nearby. Antenna 230 is navigated into tumor 210 using an electromagnetic (EM) tracking system, also referred to as electromagnetic navigation (EMN). Antenna 230 may be displayed as a ghost, or shadow, image on the fused imaging. EM tracking sensors may be positioned on antenna 230 and/or on a US transducer. There may also be sensors on the patient to support CT/US fusion and or track breathing for an image deformation algorithm.

Figure 2C:
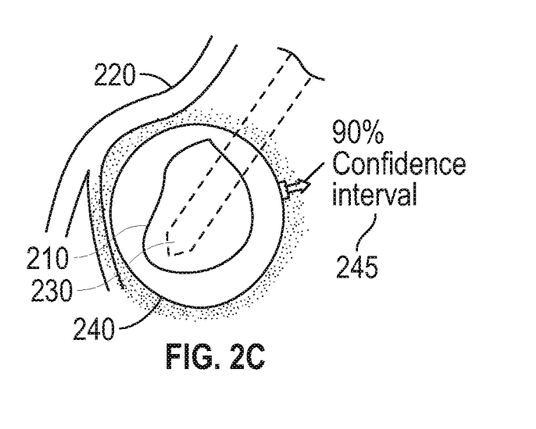

FIG. 2C illustrates predicted ablation zone 240, which is generally spherical and centered on the distal end of antenna 230. Therefore, predicted ablation zone 240 may enclose tumor 210. A size and shape of predicted ablation zone 240 may be determined by power and time settings for the proposed ablation, tumor (or other target) type, embedded tissue type, and/or proximity to vessels, for instance vessel 220. A user may select settings for predicted ablation zone 240, which may be displayed with respect to antenna 230, and may adjust the settings to obtain a different predicted ablation zone 240. Predicted ablation zone 240 may have a thickness representing a zone of uncertainty due to the uncertainty in the ablation prediction, and may additionally have confidence interval 245, which may be displayed alongside predicted ablation zone 240, or elsewhere. Confidence interval 245 is based on the prediction, the uncertainty, and local factors, for instance a tumor type of tumor 210 and a proximity of vessel 220. A user may select the preferred method to visualize the confidence interval (see FIGS. 3-5), and may also select a desired confidence interval (for example, 80%, 90%, 95%, etc.).

Figure 2D:
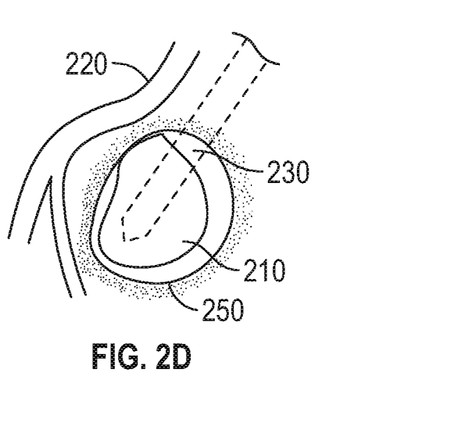

FIG. 2D illustrates second predicted ablation zone 250, which is deflected with respect to predicted ablation zone 240 based on a proximity of vessel 220, a boundary of tumor 210, and/or other information input by a user. A size of vessel 220 and/or a predicted flow rate in vessel 220 may be input by a user and impact the deflection of predicted ablation zone 250 with respect to predicted ablation zone 240. As shown in FIG. 2D, as a result of the deflection, second predicted ablation zone 250 does not fully enclose the boundaries of tumor 210, and consequently the margin may be considered minimal or negative.

Figure 2E:
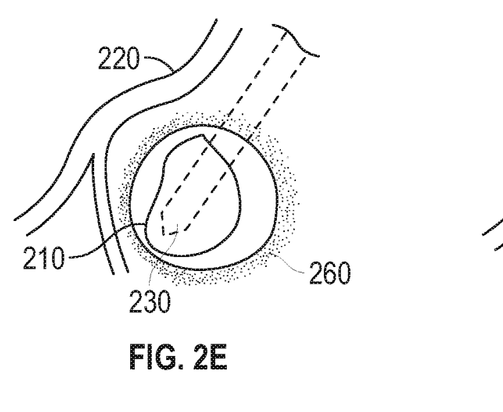

FIG. 2E illustrates third predicted ablation zone 260, which may be determined based on adjusted settings, for instance power and time, with respect to predicted ablation zone 250. A user may adjust the settings based on the minimal or negative margin shown in FIG. 2D. Since third predicted ablation zone 260 has a positive margin, the ablation may be performed using these settings.

Figure 2F:
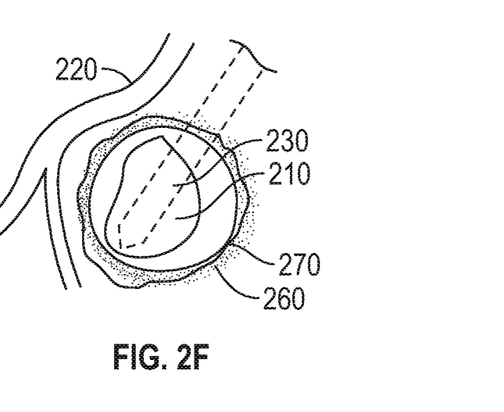

FIG. 2F illustrates a post-ablation display. After ablation, CEUS may be used to denote ablation boundary 270. Visualization of the ablation boundary 270 may be accentuated with visualization artifacts (for example, a black boundary) and may be compared to third predicted ablation zone 260 by superposition.

Figure 3:
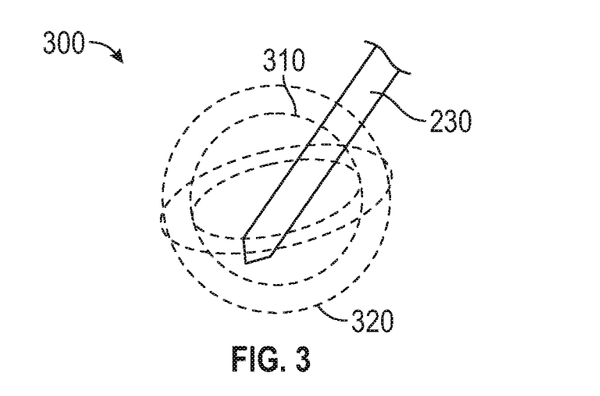
FIG. 3 is a schematic illustration of an exemplary display method for displaying real-time ablation growth projections in accordance with embodiments of the present disclosure.

FIG. 3 is a schematic illustration of an exemplary display method for displaying real-time ablation growth projections. FIG. 3 depicts confidence interval visualization 300 using nested spheroids arranged around the distal end of antenna 230. Inner spheroid 310 represents a lower boundary of the confidence interval, and outer spheroid 320 represents an upper boundary of the confidence interval.

Figure 4:
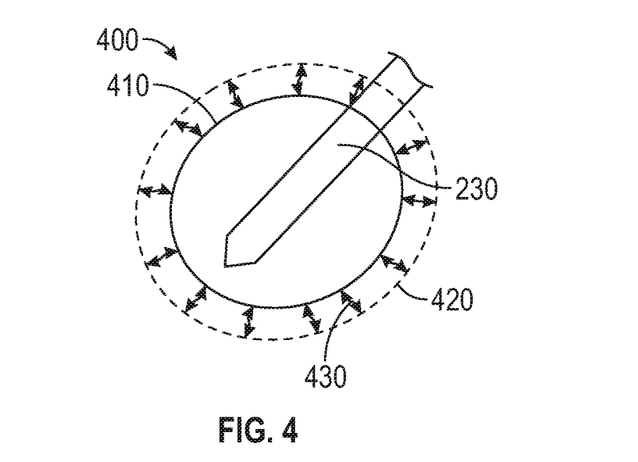
FIG. 4 is a schematic illustration of an exemplary display method for displaying real-time ablation growth projections in accordance with embodiments of the present disclosure.

FIG. 4 is a schematic illustration of another exemplary display method for displaying real-time ablation growth projections using a spheroid which repeatedly grows from a minimum to a maximum. FIG. 4 depicts confidence interval visualization 400 using a spheroid which grows from lower boundary 410 of the confidence interval to upper boundary 420 of the confidence interval, and then repeats. The cycle time could be selected by the user (for example, 1 sec., 2 sec., 5 sec., 10 sec., etc.). The cycle could move in either direction of double ended arrow 430, for example from lower boundary 410 to upper boundary 420 and then repeating, from lower boundary 410 to upper boundary 420 and then back to lower boundary 410, or from upper boundary 420 to lower boundary 410 and then repeating.

Figure 5:
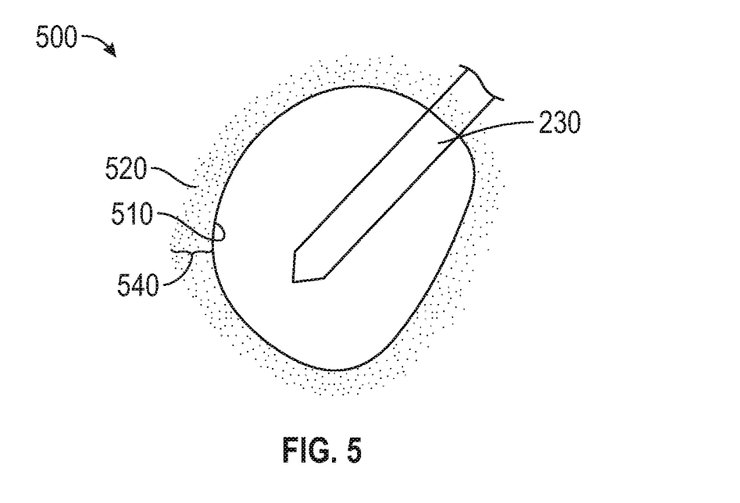
FIG. 5 is a schematic illustration of an exemplary display method for displaying real-time ablation growth projections in accordance with embodiments of the present disclosure.

FIG. 5 is a schematic illustration of a further exemplary display method for displaying real-time ablation growth projections. FIG. 5 depicts confidence interval visualization 500 using a spheroid with a gradient glow between a minimum and a maximum. Confidence interval visualization 500 extends outward from highest confidence level 510 for distance 540 to a lowest confidence level. Gradient 520 between highest confidence level 510 and the lowest confidence level provides a variable glow showing brighter near highest confidence level 510 and dimmer at the lowest confidence level. Alternative methods for displaying this gradient are possible.

The present technology enables a system to, after displaying the projected ablation zone, with confidence margins, to automatically determine that the projected ablation zone is sub-optimal such that an adjustment of the parameters is warranted. For example, if the boundaries of the tumor and the boundaries of the projected ablation zone are known and fused together into one visualization space, the system could automatically determine the settings, including for example power and time. Additionally, the system may advise a clinician to re-position the antenna for a better ablation projection, and consequently a better outcome of an ablation procedure. A system according to the present technology may display the margin predicted based upon a comparison of the boundaries of the tumor and a predicted ablation zone. If the number is negative (i.e., the tumor boundary exceeds the predicted ablation zone boundary), the user may be advised to increase the dose. Alternatively, if the number is positive, the dose may be optimized to achieve only a desired amount of positive margin (for example, 1 mm, 5 mm, or 10 mm).

In the present technology, the confidence margin has an associated confidence level. The confidence level may be a percentage, and may be adjustable. For example, a conservative clinician may want the target to fall within a 95% confidence level, while another clinician may be satisfied with an 80% confidence level at the edge of the target.

Figure 6:
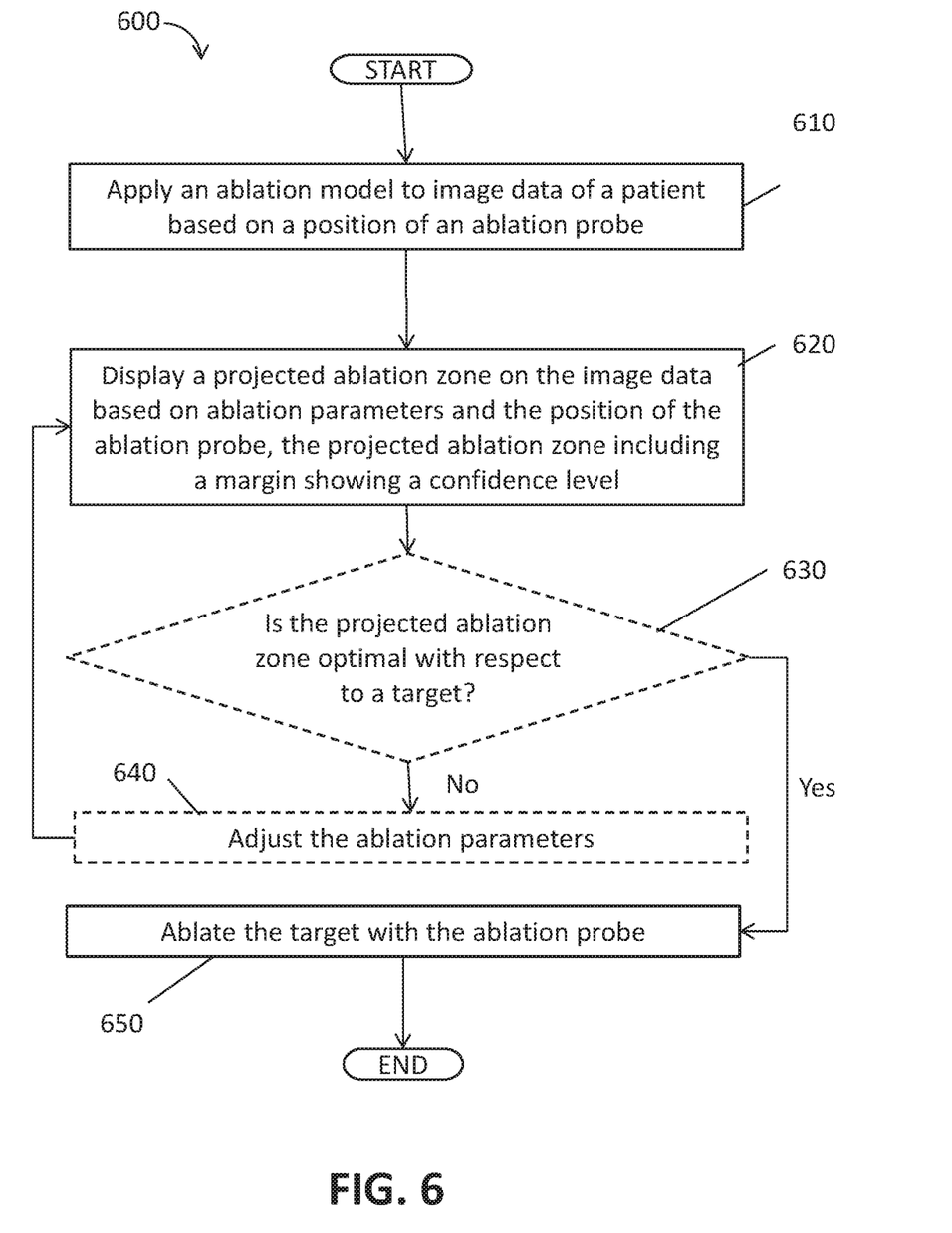
FIG. 6 is a flow chart illustrating a method for displaying real-time ablation growth projections in accordance with embodiments of the present disclosure.

FIG. 6 is a flow chart illustrating method 600 for displaying real-time ablation growth projections. In method 600, optional method steps are shown in dashed lines. From the start oval, the process flows to operation 610, which indicates to apply an ablation model to image data of a patient based on a position of an ablation probe. From operation 610, the flow proceeds to operation 620 which indicates to display a projected ablation zone on the image data based on ablation parameters and the position of the ablation probe, the projected ablation zone including a margin showing a confidence level. From operation 620, the flow proceeds to optional query 630, which asks if the projected ablation zone is optimal with respect to a target. If the answer to optional query 630 is negative, the flow in method 600 proceeds to optional operation 640, which indicates to adjust the ablation parameters. From optional operation 640, the flow proceeds to operation 620, discussed above. If the answer to optional query 630 is affirmative, the flow in method 600 proceeds to operation 650, which indicates to ablate the target with the ablation probe. In embodiments of method 600 which do not include optional query 630 and optional operation 640, the flow proceeds from operation 620 to operation 650. From operation 650, the flow proceeds to the end oval.

Figure 7:
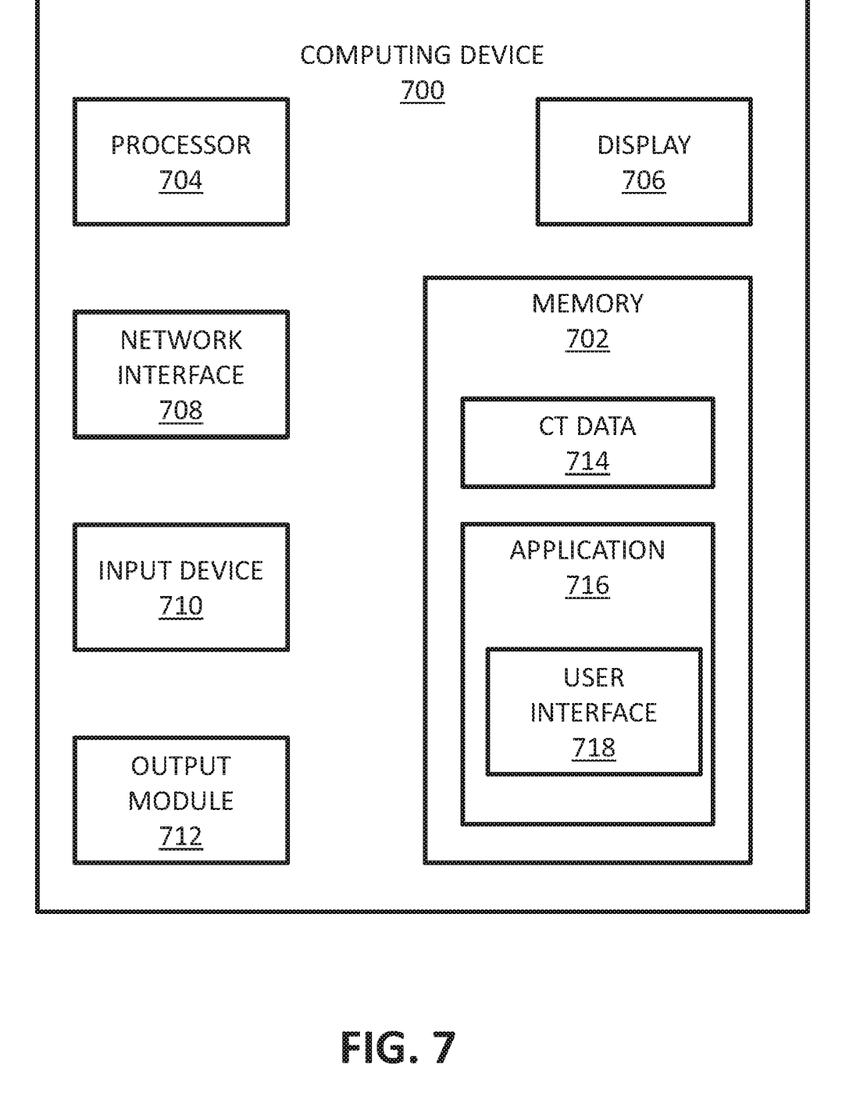
FIG. 7 is a schematic diagram of a computing device for use in accordance with an illustrative embodiment of the present disclosure.

Referring to FIG. 7, the present disclosure may use, or be executed by, a computing device 700, such as, for example, a laptop, desktop, tablet, or other similar device, having a display 706, memory 702, one or more processors 704 and/or other components of the type typically found in a computing device. Display 706 may be touch sensitive and/or voice activated, enabling display 706 to serve as both an input and output device. Alternatively, a keyboard (not shown), mouse (not shown), or other data input devices may be employed.

Memory 702 includes any non-transitory, computer-readable storage media for storing data and/or software that is executable by processor 704 and which controls the operation of the computing device 700. In an embodiment, the memory 702 may include one or more solid-state storage devices such as flash memory chips. Alternatively or in addition to the one or more solid-state storage devices, memory 702 may include one or more mass storage devices connected to the processor 704 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 704. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by the computing device 700.

Memory 702 may store CT data 714, which may be raw or processed data. Additionally, memory 702 may store application 716, which may be executable by processor 704 to run any programs described herein. Application 716 may include instructions for operation of user interface 718, which may utilize input device 710.

Computing device 700 may also include a network interface 708 connected to a distributed network or the internet via a wired or wireless connection for the transmission and reception of data to and from other sources. For example, computing device 700 may receive computed tomographic (CT) image data of a patient from a server, for example, a hospital server, internet server, or other similar servers, for use during surgical ablation planning. Patient CT image data may also be provided to computing device 700 via a removable memory 702.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A method, comprising:
   generating, by a processor, a projected ablation zone of an ablation probe based on ablation parameters;
   displaying, on a display coupled to the processor, a representation of the ablation probe and the projected ablation zone on image data of a patient, the projected ablation zone being displayed with a zone of certainty surrounding a target within the patient and representing a confidence interval associated with a margin of an actual ablation zone resulting from an ablation procedure, the confidence interval being between a lower boundary of the zone of certainty and an upper boundary of the zone of certainty; and
   syncing the confidence interval with the ablation procedure on the display to enable visualization of the confidence interval of the actual ablation zone on the image data of the patient while the margin of the actual ablation zone increases in size, wherein the confidence interval is shown on the display during the ablation procedure as a spheroid dynamically and repeatedly oscillating between the lower boundary of the zone of certainty and the upper boundary of the zone of certainty to visually convey uncertainty in the margin of the actual ablation zone.

2. The method according to claim 1, further comprising:
   adjusting the ablation parameters to generate adjusted ablation parameters;
   generating an adjusted projected ablation zone based on the adjusted ablation parameters; and
   displaying the adjusted projected ablation zone on the image data, the adjusted projected ablation zone being displayed with an adjusted confidence interval associated with an adjusted margin of the adjusted projected ablation zone.

3. The method according to claim 1, further comprising ablating the target based on the ablation parameters.

4. The method according to claim 1, further comprising:
   determining the ablation parameters based on at least one of a target position, a target size, a target shape, or a position of the ablation probe; and
   displaying the ablation parameters.

5. The method according to claim 1, further comprising:
   determining that the ablation parameters are sub-optimal based on comparing the projected ablation zone, the margin, and the target;
   adjusting the ablation parameters to generate adjusted ablation parameters;
   generating an adjusted projected ablation zone based on the adjusted ablation parameters; and
   displaying the adjusted projected ablation zone.

6. The method according to claim 1, wherein the ablation parameters include at least a time selection and a power selection.

7. The method according to claim 1, wherein the projected ablation zone is displayed with a second confidence interval associated with a second margin of the projected ablation zone.

8. The method according to claim 7, further comprising displaying the margin and the second margin using at least one of different colors or different shading.

9. The method according to claim 1, further comprising displaying a numerical value for a confidence level of the confidence interval.

10. The method according to claim 1, further comprising deflecting the projected ablation zone based on at least one of a tissue material, a disease condition, or an arterial position.

11. The method according to claim 1, wherein a position of the representation of the ablation probe is determined prior to the ablation procedure.

12. The method according to claim 1, further comprising:
    tracking the ablation probe during the ablation procedure, wherein a position of the representation of the ablation probe is based on a current position of the ablation probe during the ablation.

13. A system for performing a microwave ablation procedure, the system comprising:
an ablation probe;
an electromagnetic tracking system configured to track a location of the ablation probe, while the ablation probe is navigated inside a patient, by using at least one electromagnetic sensor located on the ablation probe; and
a computing device including a processor and a memory storing instructions which, when executed by the processor, cause the computing device to:
generate a projected ablation zone of the ablation probe based on ablation parameters;
display, on a display coupled to the processor, a representation of the ablation probe and the projected ablation zone on image data of the patient, the projected ablation zone being displayed with a zone of certainty surrounding a target within the patient and representing a confidence interval associated with a margin of an actual ablation zone resulting from the microwave ablation procedure, the confidence interval being between a lower boundary of the zone of certainty and an upper boundary of the zone of certainty; and
sync the confidence interval with the ablation procedure on the display to enable visualization of the confidence interval of the actual ablation zone on the image data of the patient while the margin of the actual ablation zone increases in size, wherein the confidence interval is shown on the display during the microwave ablation procedure as a spheroid dynamically and repeatedly oscillating between the lower boundary of the zone of certainty and the upper boundary of the zone of certainty to visually convey uncertainty in the margin of the actual ablation zone.

14. A non-transitory computer-readable storage medium storing instructions which, when executed by a processor, cause a computing device to:
generate a projected ablation zone of and ablation probe based on ablation parameters;
display, on a display coupled to the processor, a representation of the ablation probe and the projected ablation zone on image data of a patient, the projected ablation zone being displayed with a zone of certainty surrounding a target within the patient and representing a confidence interval associated with a margin of an actual ablation zone resulting from an ablation procedure, the confidence interval being between a lower boundary of the zone of certainty and an upper boundary of the zone of certainty; and
sync the confidence interval with the ablation procedure on the display to enable visualization of the confidence interval of the actual ablation zone on the image data of the patient while the margin of the actual ablation zone increases in size, wherein the confidence interval is shown on the display during the ablation procedure as a spheroid dynamically and repeatedly oscillating between the lower boundary of the zone of certainty and the upper boundary of the zone of certainty to visually convey uncertainty in the margin of the actual ablation zone.

* * * * *